United States Patent [19]

Wyse et al.

[11] 4,297,123
[45] * Oct. 27, 1981

[54] METHOD AND APPARATUS FOR PRODUCING A NITRATE FERTILIZER

[76] Inventors: Harold G. Wyse, 3629 N. Dixie Dr., Dayton, Ohio 45414; Millard S. Smith, 5625 W. Kochville Rd., Saginaw, Mich. 48604

[*] Notice: The portion of the term of this patent subsequent to Feb. 27, 1996, has been disclaimed.

[21] Appl. No.: 119,638

[22] Filed: Feb. 7, 1980

[51] Int. Cl.³ .............................. B01K 1/00; C05C 5/00
[52] U.S. Cl. .................................. 71/58; 204/179; 422/186
[58] Field of Search ................. 71/1, 53, 54, 58, 61, 71/64 A, 64 C, 64 G, 64 SC; 239/1, 8–10, 289, 310, 311, 318, 340, 375, 369, 371, 398; 422/166, 171, 194, 305, 186; 55/68, 89, DIG. 30; 423/194, 351, 400, 405; 204/179

[56] References Cited

U.S. PATENT DOCUMENTS

| | | | |
|---|---|---|---|
| 3,888,652 | 6/1975 | Yie et al. | 71/54 X |
| 4,010,897 | 3/1977 | Treharne et al. | 71/53 X |
| 4,133,671 | 1/1979 | Mikel | 71/54 |
| 4,141,715 | 2/1979 | Wyse et al. | 71/58 |

*Primary Examiner*—S. Leon Bashore
*Assistant Examiner*—Ferris H. Lander
*Attorney, Agent, or Firm*—Jacox & Meckstroth

[57] ABSTRACT

A portable, self-contained system for producing nitric acid from a supply of electricity and water, incorporates a nitrogen generating unit including a cabinet enclosing a manifold defining a plurality of series connected air combustion chambers each having one electrode concentric within a restricting orifice defined by a second electrode. The unit also includes an air compressor for supplying air which spirals through each combustion chamber to rotate the arc within the orifice, and each combustion chamber is exposed for viewing through a corresponding lens. The system also incorporates a liquid fertilizer generator unit including a closed plastic tank containing water and a submersible pump which recirculates the water through an aspirator where nitrogen gas is introduced into the water and then through a long plastic absorption tube coiled within the tank. The compressor also supplies additional oxygen to the tank for further converting nitrous oxide to nitric acid.

21 Claims, 8 Drawing Figures

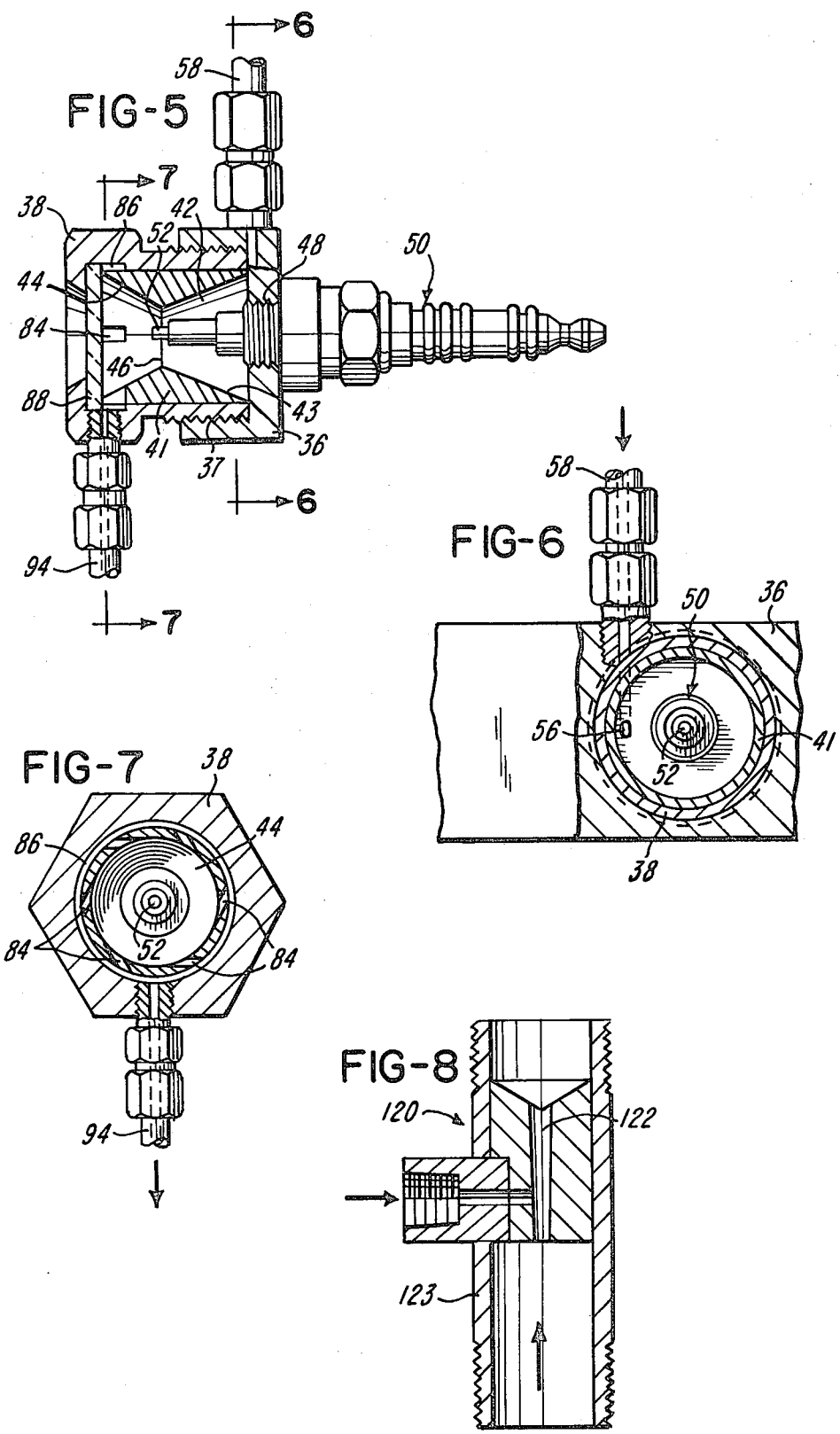

METHOD AND APPARATUS FOR PRODUCING A NITRATE FERTILIZER

BACKGROUND OF THE INVENTION

As stated in Applicants' U.S. Pat. No. 4,141,175, current world food strategy relies heavily upon the use of improved technology. The societal need is now well established for a new, relatively low cost, minimally energy-consuming process for the production of fixed nitrogen that can be put into service with much lower capital outlay than existing technology offers and has the advantage of eliminating transportation costs.

Increased cost of nitrogen fertilizer is only one of the many results of an increasing world demand for food and a decreasing supply of natural gas and liquid hydrocarbons which provide the primary source of hydrogen used in their production. Long range solutions to the world food problem will require that more and more countries develop the capability to feed themselves rather than be dependant on ever increasing production from areas of the world which are currently experiencing high yields. This will be necessary not only for economic reasons (an underdeveloped country's ability to purchase in a competitive world market), but also to minimize the global effects of unfavorable weather or other natural disasters occuring in one of the high yield areas of the world.

The world food problem is increasing the demands for nitrogen fertilizer at a time when supplies of natural gas and other fuels used in their production are decreasing and becoming more expensive. One method to compensate for present and future shortages of nitrogen fertilizers is to produce nitrate fertilizer from air and water using electric arc discharge in air processes. However, to make electric arc discharge processes economically competitive, the need exists for a compact nitrate fertilizer production unit specifically designed for installation and use at the point of fertilizer application. Nitrate fertilizer generating systems installed on site can virtually eliminate storage, transportation and capital amortization costs which account for more than two thirds of the price of present day nitrogen fertilizers.

Prior to the development of the Haber-Bosch process for the production of ammonia fertilizer, a wide variety of methods were explored for the oxidation of nitrogen to nitrate fertilizers. Some of the more pratical methods that evolved into commercial nitrate fertilizer production systems were based on the principle of combining the nitrogen and oxygen of air by means of various electrical arc discharge processes. However, to be economically competitive with natural fertilizer at that time, most of the arc process systems developed were located near large hydroelectric generating plants to minimize electrical power costs. With few exceptions, rural electrification did not exist. Consequently, line powered nitrate fertilizer generators were neither practical nor, perhaps, even considered.

With the advent of the Haber-Bosch process, using relatively inexpensive hydrogen obtained from natural gas and liquid hydrocarbon sources, the electric arc processes ceased to be competitive and were generally abandoned. It was found to be more efficient to use the same electrical energy to hydrolize water to produce hydrogen as the feed stock for the Haber-Bosch process.

Today, even with the shortage and increased cost of natural gas, calculations indicate that electric arc processes for the production of nitrate fertilizer probably could not be competitive if storage, transportation, distribution, and capital amortization costs were excluded. The largest proportion (often exceeding 75%) of the delivered price of anhydrous ammonia comes from costs other than actual production. Expensive storage and distribution costs generally arise since the ammonia production plants necessarily must be located close to large quantities of natural gas. Fertilizer usage is highly seasonal, but large Haber process plants must be operated on a continual basis such as 360 days per year to be cost efficient. With shortages of fossil energy becoming ever more acute, transportation costs will naturally increase and also create a double (one to produce-one to transport) expense from an energy economics point of view.

SUMMARY OF THE INVENTION

The present invention is directed to an improved and practical method and compact apparatus or unit for providing nitrate fertilizer and which is primarily intended for use at individualized locations for on site production. One form of this on site nitrate fertilizer production system utilizes wind-electric generators as the energy source to convert air and water to nitrate fertilizer. However, any alternate forms of electric power generation are also compatible with the system.

In general, nitrate fertilizer is produced in accordance with the invention by introducing pressurized air tangentially into a plurality or set of generators connected in parallel. Each generator has a circular chamber which receives concentric electrode elements for producing a rapidly swirling plasma arc. All of the air is required to pass through the swirling arcs of the generators, and the output of these generators is directed through another set of generators for efficiently producing nitrogen oxide gases. In accordance with one embodiment, all of the generators are supported within a cabinet which also encloses an air supply pump, electrical transformers for producing arcs within the generators, a control timer and cooling fans. The nitrogen oxide and dioxide gases produced by the generators are directed through a solenoid protector valve to a venturi within the output line of a water pump located within an adjacent storage tank. The gases are introduced into a continuous flow of water being recirculated by the pump through a long length of tubing coiled within the tank to provide for substantial gas-water exposure time and efficient formation of nitric and nitrous acids.

Other features and advantages of the invention will be apparent from the following description, the accompanying drawings and the appended claims.

BRIEF DESCRIPTION OF THE DRAWINGS

FIG. 5 is an enlarged fragmentary section taken generally on the line 5—5 of FIG. 3;

FIG. 6 is a fragmentary section taken on the line 6—6 of FIG. 5;

FIG. 7 is a fragmentary section taken generally on the line 7—7 of FIG. 5; and

FIG. 8 is an enlarged fragmentary section of the aspirator shown in FIG. 4.

DESCRIPTION OF THE PREFERRED EMBODIMENTS

Figure 1:
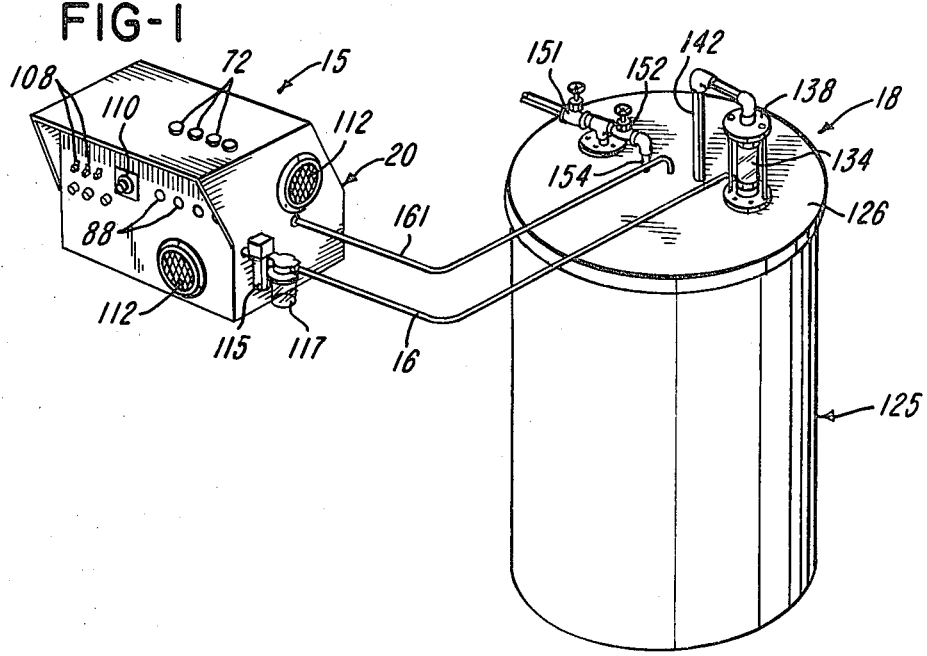
FIG. 1 is a perspective view of a nitrogen generating unit and a water recirculating tank constructed in accordance with the invention for efficiently producing a nitrate fertilizer.

The system shown in FIG. 1 is effective to produce significant quantities of nitrogen oxides which are converted into a fertilizer. The energy requirements for the formation of nitrogen oxides in the electric arc process are given by one or more of the following reactions:

$N_2 + O_2 \rightarrow 2NO$, $\Delta G = +41.4$ Kcal
$2NO + O_2 \rightarrow 2NO_2$, $\Delta G = -16.6$ Kcal
$N_2 + 2O_2 \rightarrow 2NO_2$, $\Delta G = +24.8$ Kcal In the system shown and with optimum air flow rates, the principle end product in the electric arc reaction cell is nitrogen dioxide ($NO_2$). The nitrogen dioxide is readily trapped in water to form nitric acid ($HNO_3$) and nitrous ($HNO_2$) acids. The chemical progression of the process is: $N_2 + O_2 \rightarrow 2NO$; $NO + \frac{1}{2}O_2 \rightarrow NO_2$; $2NO_2 + H_2O \rightleftharpoons HNO_3 + HNO_2$. By the addition of line, $CaCO_3$ to the water, these acids are converted primarily into calcium nitrate fertilizer ($CaCO_3 + 2HNO_3 \rightarrow Ca(NO_3)_2 + CO_2 + H_2O$). The nitrogen fertilizer may be used as it is produced by spraying, incorporating into a hydroponic system, or alternately, if an existing irrigation system exists at the site, the nitrogen fertilizer simply may be fed into the irrigation feed water. A third option is to store the fertilizer as calcium nitrate (a very stable compound) in tanks, open basins or plastic lined trenches, and used when needed.

The system may consist of a small capacity system for the consumer market and which is designed to produce liquid fertilizer in a semi-permanent storage vessel from which it is syphoned into the water stream of a garden hose when the lawn, garden or other crop is watered. The system may also consist of a larger capacity field unit which utilizes either commercial or wind-electric generated power by manifolding a large number of smaller units to increase the capacity of fixed nitrogen production.

Electrical energy to drive the nitrogen fertilizer production system on a farm location may be obtained from a conventional 110 volt or 220 volt power source which incorporates a step-up transformer to obtain the higher voltages desirable for electric arc processes. A more economical, and generally available, power source can be the 7200 volt system commonly used for distribution of residential power by most utility companies in the United States.

The following projected economic calculations are based on using power drawn from a 7200 volt transmission line power source to eliminate the need for a step-up voltage transformer. As indicated by the calculations, economic costs for the system, assuming 10% efficiency of the overall process, are competitive based on present day costs of anhydrous ammonia. Starting with theoretical energy requirements and assuming 10% efficiency for the formation of nitrogen dioxide by the arc discharge through air process, electrical energy costs are projected based on a system to produce one ton of fixed nitrogen. All estimates and assumptions are believed to be conservative.

Theoretical Energy Requirements

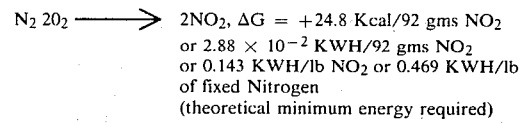

$N_2 + 2O_2 \longrightarrow 2NO_2$, $\Delta G = +24.8$ Kcal/92 gms $NO_2$
or $2.88 \times 10^{-2}$ KWH/92 gms $NO_2$
or 0.143 KWH/lb $NO_2$ or 0.469 KWH/lb of fixed Nitrogen
(theoretical minimum energy required)

Projected Electrical Energy Costs

Assuming 10% efficiency of the above reaction, one ton of fixed nitrogen would require $2000 \times 4.690 = 9380$ KWH per ton. Based on a commercial rate of two cents per KWH, projected electrical energy costs per ton of fixed nitrogen would be:

$9380 \times \$0.02 = \$188.00$ per ton of fixed nitrogen.

As stated previously, wind-electric or other forms of power generation may be used to drive the system in which case the cost per ton of fixed nitrogen would be more dependent on capital costs for equipment and maintenance requirements for the equipment.

The liquid fertilizer generating system illustrated in FIG. 1 includes a nitrogen generating unit 15 for producing nitrogen dioxide gas which is directed through a line 16 to a liquid fertilizer generating unit 18. The nitrogen generating unit 15 incorporates a sheet metal cabinet 20 having sidewalls 23 and 24 (FIG. 2) rigidly connected by a bottom wall 26, the cabinet 20 also includes a front wall 28 and a removable combined top and rear wall cover 29. The cabinet 20 encloses a parallel-series air combustion unit 35 (FIGS. 2 and 3) which includes an elongated metal bar or body 36 having a series of longitudinally spaced threaded counterbores 37 (FIG. 5) each of which receives a tubular fitting 38. Each of the fittings 38 encloses a combined combustion cylinder and electrode 41 which defines an hour-glass combustion chamber 42 formed by converging frusto-conical surfaces 43 and 44 connected by a circular restriction orifice 46.

A threaded hole 48 is formed within the body 36 concentrically with each of the orifices 46 and receives an electrode element 50 in the form of a sparkplug 50. Each of the sparkplugs 50 has an inner electrode tip 52 which is located concentrically within the orifice 46, and the spark generated by the sparkplug or electrode 50 jumps across the annular gap between the electrode element 52 and the sharp edge defining the orifice 46.

Figure 2:
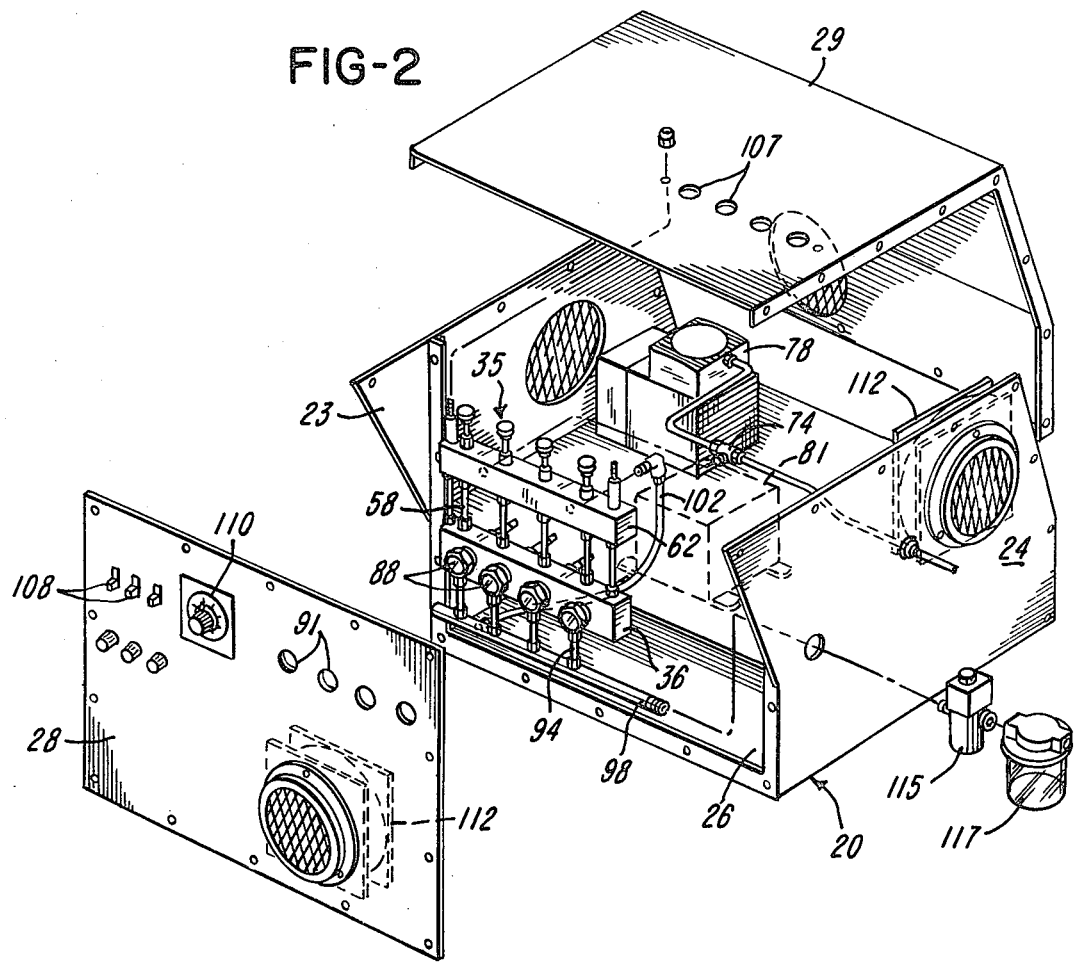
FIG. 2 is a partially exploded enlarged view of the gas or nitrogen generating unit shown in FIG. 1.
Figure 3:
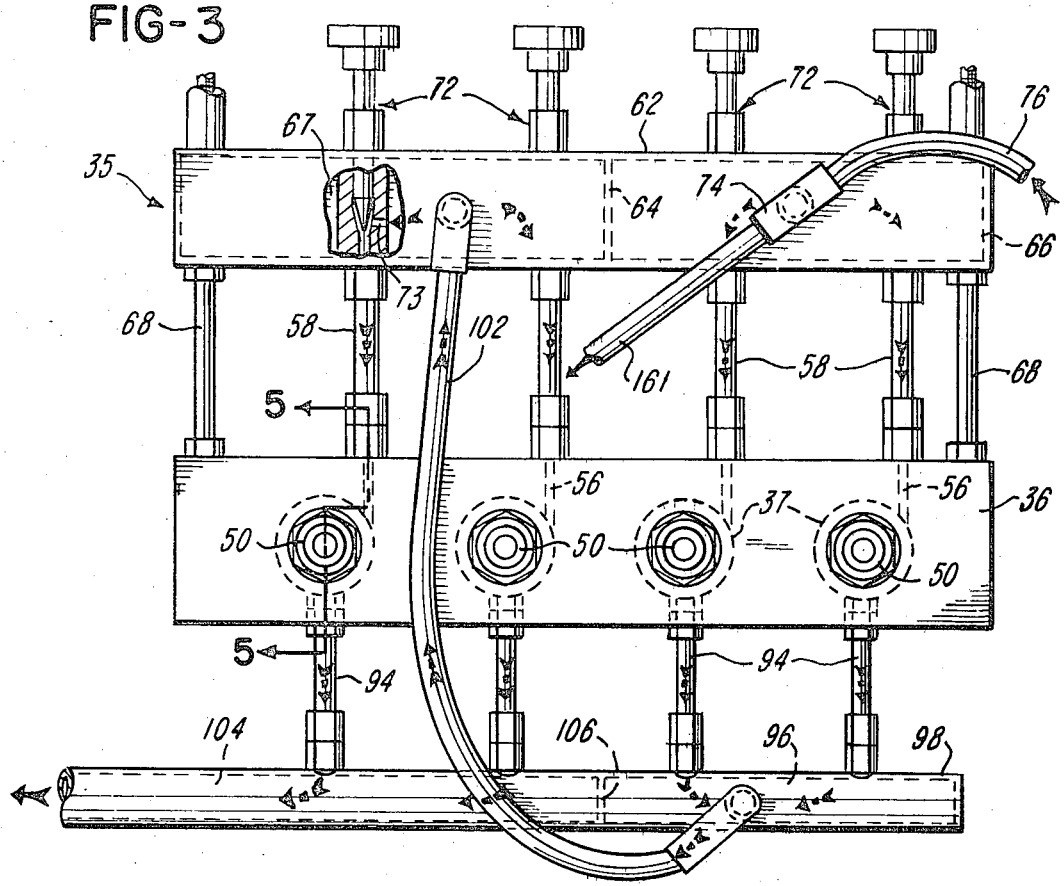
FIG. 3 is an enlarged elevational view of the air combustion units shown in FIG. 2.

Compressed air is supplied to each of the combustion chambers 42 through a generally tangential passage 56 (FIG. 6) which connects with an air supply line 58 extending downwardly from an air supply manifold 62 (FIG. 3). The air supply manifold 62 is divided by an internal wall 64 into two chambers 66 and 67. A pair of tie bolts 68 connect the manifold 62 to the bar or body 36, and the manifold 62 supports a needle valve assembly 72 for each of the air supply lines 58. Each of the needle valve assembly 72 has an inlet 73 which connects with the corresponding chamber. Compressed air is supplied to the chamber 66 (FIG. 3) of the manifold 62 through a T-fitting 74 connected by a line 76 to a combined motor driven air compressor 78 (FIG. 2) located within the bottom portion of the cabinet 20. The compressed air flows from the chamber 66 of the manifold 62 through the corresponding two needle valves 72 and to the inlet passages 56 of the corresponding two air combustion chambers 42. High voltage power, for example, on the order of 5,000 volts, is supplied to each of the electrodes 50 from the corresponding transformer 81 (only one shown in FIG. 2) located within the lower portion of the cabinet 20 and adapted to receive a power supply of 120 volts.

As the compressed air flows into each of the combustion chambers 42, the air spirals inwardly along the surface 43 and increases in velocity towards the orifice 46 where all of the air is required to pass through the orifice. The swirling air causes the arc to rotate rapidly and, in effect, produces an annular flame within the orifice. The combustion of the air produces oxygen which recombines with the nitrogen in the air to form nitrogen dioxide. This gas flows from the chamber 42 through a series of tangential outlet ports 84 (FIG. 7) and into an annular chamber 86 defined by the fitting 38. As shown in FIG. 5, a circular quartz lens 88 is retained within each of the tubular fittings 38 and is confined between the fitting 38 and the tubular electrode 41 adjacent the outlet ports 84. The fittings 38 and corresponding lens 88 projects through corresponding holes 91 (FIG. 2) formed within the front wall 28 of the cabinet 20 and provide for visually observing the rotating spark and flame and the combustion of the air within each of the chambers 42. While the flame is being observed, the needle valves 72 may be precisely adjusted to obtain maximum production of nitrogen dioxide.

The combustion gases produced in the two combustion chambers 42 connected in parallel to the air manifold chamber 66 are directed through the corresponding outlet lines 94 (FIGS. 3 and 5) to a chamber 96 defined within the right end portion of a tubular outlet manifold 98 (FIG. 3). From the chamber 96, the gases are directed through a line 102 to the chamber 67 within the manifold 62 and from the chamber 67, the gases are directed through the outer two parallel connected combustion chambers 42 at the left of the body 36. This series connection of the two pairs of combustion chambers 41 provides for more complete combustion of the oxygen within the air and the formation of more concentrated nitrogen dioxide gas. The gas flowing through the two outlet lines 94 shown at the left in FIG. 3, are collected within a second chamber 104 within the outlet manifold 98, and the chamber 104 is separated from the chamber 96 by an internal wall 106.

As shown in FIG. 2, the finger operated valve stems of the needle valves 72 project through corresponding holes 107 within the top cover 29 of the housing or cabinet 20 to facilitate convenient adjustment of each needle valve and thereby provide the desired flow rate of gas into each of the combustion chambers 42 for obtaining the optimum combustion within the chamber. The front panel 28 of the cabinet 22 also supports a set of control switches 108, one of which controls the air compressor 78 and another of which controls the spark generators of power supplied to the transformers 81. A control timer 110 is also supported by the front panel 28 and provides for selecting the desired operating time for the nitrogen generating unit 15, for example, up to 24 hours. FIG. 2 also shows a set of motor driven fans 112 which are mounted on the walls 24 and 28 and serve to cool the transformers 81 and the interior of the cabinet 20.

The nitrogen oxides or gases supplied to the chamber 104 within the outlet manifold 98, are directed through a solenoid control valve 115 (FIG. 2) which is connected to a liquid collecting filter unit 117. The gases flow from the liquid filter unit 117 into an aspirator 120 (FIGS. 4 and 8) having a tapered venturi passage 122 defined by a coupling 123. The aspirator 120 is located within a molded plastic tank 125 which forms part of the liquid fertilizer generating unit 20. As illustrated in FIG. 1, the tank 125 has a capacity of approximately fifty gallons of water and is closed by a removable lid or cover 126 which is also preferably formed of a plastics material. A submersible motor-pump unit 128 (FIG. 4) is located within the lower portion of the tank 125 and has an inlet line 129 adjacent the bottom of the tank. The outlet of the unit 128 is connected by a line 132 to the aspirator 120 where the nitrogen gases supplied through the flexible line 16 are aspirated into the water flowing upwardly through the line 132 and aspirator 120. The third switch 108 on the front panel 28 controls the pump unit 128.

The upper end or outlet of the aspirator 120 is connected to a tubular sight-glass 134 which is confined between fittings 136 clamped between a set of plates 138 mounted on the cover 126 for the tank 125. The sight-glass 134 provides for observing the flow of water and combined nitrogen gases to assure that the pump 128 is operating properly and that nitrogen oxides are being introduced into the water. A line 142 is connected to the upper end of the sight-glass 134 and extends downwardly to the bottom of the tank 125. The line 142 connects with the lower end of a long plastic tube 144 which extends in a helical manner within the tank 124 (FIG. 4) to form a gas absorption coil 145.

Preferably, the tube 144 has substantial length, for example, on the order of two hundred or more feet, and the upper end of the tube 144 connects with a line 147 which projects upwardly through the cover 126 to a fitting 148 positioned between a pair of valves 151 and 152. A line 154 extends from the valve 152 back downwardly into the lower portion of the tank 125 so that when the valve 152 is open, the water within the tank 124 is recirculated by the motor-pump unit 128 through the aspirator 120 and the absorption coil 145. This recirculation of the water and nitrogen dioxide progessively increase the concentration of the nitric acid and nitrous acid produced within the tank 125. When it is desired to withdraw some of solution from the tank 125, the valve 151 is opened and the valve 152 is closed. Additional water may then be supplied to the tank 125 to maintain a water level within the upper portion of the tank.

Figure 4:
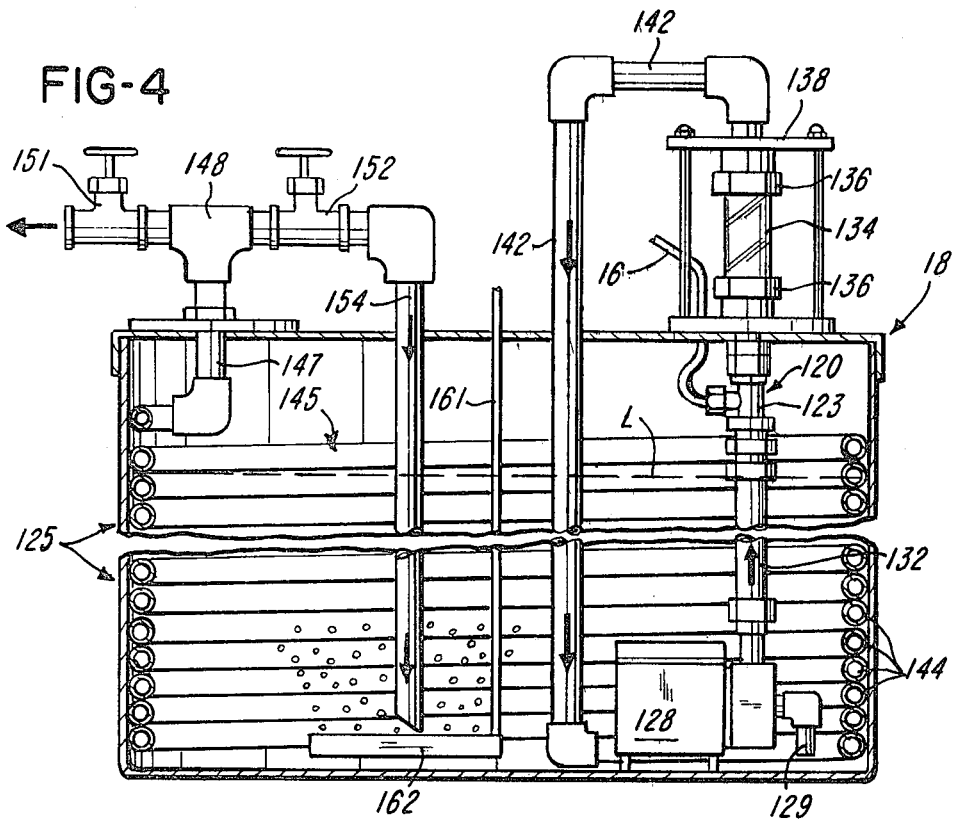
FIG. 4 is an enlarged vertical section of the recirculating tank shown in FIG. 1 with a center portion broken away.

Referring to FIGS. 1, 3 and 4, an air supply line 161 is connected to the fitting 74 mounted on the back of the air supply manifold 62 and extends outwardly from the cabinet 20 and downwardly through the cover 126 to the bottom of the tank 125. The tube 161 connects to an air sparging or dispersing tube 162 which has fine holes so that air from the compressor 78 is introduced into the lower portion of the tank 125, as illustrated by the bubbles in FIG. 4. Calcium hydroxide or calcium carbonate, in the form of limestone or hydrabed lime, is added to the lower portion of the tank 125 and combines with the additional oxygen supplied through the tube 162 to release the calcium for combining with the nitrogen to produce calcium nitrate in the water solution within the tank 125. The additional oxygen added to the water through the line 161 and tube 162 also cooperates in converting the unstable nitrous oxide gas ($NO_2$) produced by the combustion units into a more stable nitric acid solution ($HNO_3$). The desired reaction accomplished by introduction of additional oxygen is: $HNO_2 + \frac{1}{2}O_2 \rightarrow HNO_3$. The cover 126 further limits the nitrous oxide gas ($NO_2$) from escaping from the tank to atmosphere thereby forcing it to continue in the above reaction to obtain a more concentrated solution of nitric acid. Other materials, such as potash and phosphate rock, may also be added to the recirculating tank 125 according to the fertilizer characteristics desired within the water removed from the tank through the valve 151.

From the drawings and the above description, it is apparent that the method and apparatus of the invention for producing a liquid nitrate fertilizer, provides desirable features and advantages. For example, the portable apparatus shown in FIG. 1 is adapted for on-sight, low cost production of a stable water-based nitrogen solution, and the concentration of the solution is determined by selecting the operating time of the apparatus through control of the timer 110. As mentioned above, trace elements may also be conveniently added to the tank 125 to meet specific or customized plant requirements.

While the apparatus illustrated is ideally suited for use by a small commercial operation such as a greenhouse operation, it is apparent that the apparatus may be constructed on a larger scale for use wherever a supply of water and a supply of electrical power are available. For example, in a larger system, two sets of the air combustion units 35 may be arranged in parallel to provide for a greater demand for nitrogen gases. In addition, the parallel-series arrangement of the combustion chambers 41 assures that all of the air flowing through the unit is required to pass through rotating arcs or flames within the orifices 46, thereby obtaining a high efficiency of combustion.

The compact liquid fertilizer generating unit 20, including the tank 124, cover 126, aspirator 120, recirculating pump 128 and absorbtion coil 145, further provides for increasing the volume of hot nitrogen gases which go into solution before the gases have an opportunity to recombine. The recirculation also progressively increases the concentration of the nitric acid within the tank 124, resulting in a more efficient production of nitrate fertilizer. In addition, the air supplied to the tank through the line 161, provides more oxygen to the water for producing additional nitric acid, and the cover 126 inhibits the escape of the nitrous oxide to atmosphere prior to combining with the oxygen to form nitric acid. Another feature is provided by the solenoid valve 115 which automatically closes when the air pump 78 stops to assure that no water or acid within the tank 124 can flow backwards in the line 16 and enter the combustion unit 35 and thereby damage the unit.

While the method and form of liquid fertilizer generating apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. A method adapted for efficiently producing a nitrate fertilizer, comprising the steps of forming an air combustion unit including a combustion chamber having a first electrode element defining a circular restriction aperture, arranging a second electrode element concentrically with said aperture, supplying an electrical voltage across said electrode elements to produce an electrical arc therebetween within the aperture, producing a spiral flow of air within the chamber and directing the flow through the restriction aperture at an increased velocity to effect rotation of the arc within the aperture and to assure the air is exposed to the arc for efficiently generating a nitrogen dioxide gas, and introducing the gas from the combustion chamber into a flow of water contained within a tank and being recirculated through an elongated absorption tube having substantial length to produce a nitric acid solution usable as a nitrate fertilizer.

2. A method as defined in claim 1 including the steps of coiling said absorption tube and locating it within the tank.

3. A method as defined in claim 2 including the step of locating a submersible motor-pump unit within said tank to recirculate the water solution through said tube.

4. A method as defined in claim 1 including the steps of forming a plurality of said combustion units, and connecting two of said combustion units in series with the gas produced in the combustion chamber of the first unit being directed into the combustion chamber of the second unit.

5. A method as defined in claim 1 including the steps of forming a plurality of said combustion units, and connecting the combustion chambers of said combustion units in parallel to a common air supply chamber and a common gas receiving chamber.

6. A method as defined in claim 1 including the step supplying air to said combustion unit from a motor driven air compressor, coiling said tube within said tank containing water, and directing additional air from said air compressor into the water within said tank for further producing nitric acid.

7. A method as defined in claim 6 including the step of covering said tank to form an enclosed tank chamber for inhibiting the escape of nitrous oxide gas.

8. A method as defined in claim 1 including the step of forming a plurality of said combustion units, and connecting one pair of parallel connected combustion units in series with a second pair of parallel connected combustion units for more efficiently producing nitrogen dioxide gas.

9. Apparatus for producing a nitrate fertilizer solution, comprising an air combustion unit including means forming a combustion chamber with a first electrode element defining a circular restriction aperture within said chamber, a second electrode element projecting into said chamber and disposed concentrically with said aperture, means for introducing a flow of pressurized air into said chamber on one side of said aperture and for directing the flow of air in a spiraling manner through said aperture, said restriction aperture causing the flow of air to increase in velocity through said aperture, means defining an exhaust passage for said chamber on the opposite side of said aperture, means for supplying a high voltage current to said electrode elements to produce an electrical arc therebetween within said aperture, the spiraling flow of air through said aperture being effective to rotate the arc within said aperture to assure the air is exposed to the arc for efficiently generating a nitrogen dioxide gas, a tank adapted to receive a volume of water, an elongated tube forming an absorption coil, a pump connected to recirculate the water within said tank through said coil, and means for directing the nitrogen dioxide gas into the recirculating flow of water within said coil to produce a dilute acid solution usable as a nitrate fertilizer.

10. Apparatus as defined in claim 9 and including a portable cabinet enclosing said combustion unit, air pump means disposed within said cabinet, transformer means disposed within said cabinet for supplying the high voltage current, means on said cabinet for controlling the operation of said air pump means and said transformer means, and fan means supported by said cabinet and disposed for directing a flow of cooling air through said cabinet.

11. Apparatus as defined in claim 9 wherein said means for directing the gas include a line connecting said exhaust passage to said tube, and electrically operated valve means within said line and connected to close said line in response to stopping of the flow of air to said air combustion unit.

12. Apparatus as defined in claim 9 including a plurality of said combustion units having the corresponding said combustion chambers connected in series.

13. Apparatus as defined in claim 12 wherein two parallel connected said combustion units are connected in series with two other parallel connected said combustion units.

14. Apparatus as defined in claim 9 and including a removable cover mounted on said tank and cooperating to form an enclosed chamber for the recirculating acid solution.

15. Apparatus as defined in claim 9 and including means for supplying pressurized air to the water within said tank for increasing the formation of nitric acid solution within said tank.

16. Apparatus as defined in claim 9 wherein said pump comprises a submersible motor-pump unit disposed within said tank.

17. Apparatus as defined in claim 9 and including means for viewing from outside said tank the flow of recirculating water after the gas is introduced into the water.

18. Apparatus as defined in claim 9 and including an air pump connected to supply pressurized air to said combustion chamber and to said tank below the surface of the water within said tank, and means closing said tank to form a closed chamber within said tank.

19. Apparatus for producing a nitrate fertilizer, comprising at least one air combustion unit including means defining a combustion chamber having a circular cross-sectional configuration and forming a first electrode element defining a circular aperture, a second electrode element projecting into said chamber and disposed concentrically with said aperture, means for introducing pressurized air into said chamber on one side of said aperture and for causing a spiral flow of air through said aperture, means defining an exhaust passage for said chamber on the other side of said aperture to assure that all of the air flowing through said inlet passage into said chamber passes through said aperture, means for supplying a high voltage to said electrode elements to produce an electrical arc therebetween, said spiral flow of air through said aperture being effective to rotate the arc within said aperture for subjecting a high proportion of said air flow to the arc for efficiently generating a nitrogen dioxide gas, a tank adapted to receive a volume of water, an elongated tube forming an absorption coil disposed within said tank and having substantial length, means for recirculating water from said tank through said coil, and means for introducing the gas generated by said combustion unit into the water flowing through said coil to provide substantial gas-water exposure time for the nitrogen oxide gas to dissolve into the water.

20. Apparatus as defined in claim 19 wherein said means for introducing pressurized air into said combustion chamber comprise motor driven air pump, conduit means for directing air from said pump into the lower portion of said tank below the water level, and means for substantially closing said tank to confine nitrous oxide gas within said tank.

21. Apparatus as defined in claim 19 and including means for stopping the flow of gas from said combustion unit to said tank in response to stopping of said means for introducing air into said combustion chamber.

* * * * *